United States Patent [19]

Fabre

[11] Patent Number: 4,810,384

[45] Date of Patent: Mar. 7, 1989

[54] HYDROPHILIC PVDF SEMIPERMEABLE MEMBRANE

[75] Inventor: Albert Fabre, Venissieux, France

[73] Assignee: Rhone-Poulenc Recherches, Courbevoie Cedex, France

[21] Appl. No.: 66,983

[22] Filed: Jun. 29, 1987

[51] Int. Cl.[4] .................. C08J 9/26; B01D 31/00
[52] U.S. Cl. ...................... 210/500.23; 210/500.3; 210/500.31; 210/500.41; 210/500.42; 521/62
[58] Field of Search ............... 521/62; 210/500.23, 210/500.3, 500.31, 500.41, 500.42

[56] References Cited

U.S. PATENT DOCUMENTS

| | | | |
|---|---|---|---|
| 3,808,305 | 4/1974 | Gregor | 210/500.23 |
| 4,302,334 | 11/1981 | Jakabhazy et al. | 210/500.23 |
| 4,384,047 | 5/1983 | Benzinger et al. | 210/500.42 |
| 4,399,035 | 8/1983 | Nohmi et al. | 210/500.23 |

Primary Examiner—Morton Foelak
Attorney, Agent, or Firm—Burns, Doane, Swecker & Mathis

[57] ABSTRACT

Hydrophilic semipermeable membranes which retain their capacity for filtration, even after drying, and which are well adapted for either ultrafiltration or microfiltration, are comprised of at least 70% by weight of polyvinylidene fluoride (PVFD) and up to 30% by weight of a hydrophilic polymer compatible therewith, e.g., a cellulose acetate or sulfonated polysulfone.

9 Claims, No Drawings

HYDROPHILIC PVDF SEMIPERMEABLE MEMBRANE

BACKGROUND OF THE INVENTION

1. Field of the Invention

The present invention relates to novel hydrophilic semipermeable membranes which can be dried without loss or deterioration in the properties thereof, and which are based principally on polyvinylidene fluoride (PVDF).

2. Description of the Prior Art

PVDF-based membranes are highly attractive, particularly in the field of ultrafiltration and/or microfiltration, because such membranes have good mechanical properties, good resistance to chemical materials, especially to the common organic solvents, and they are easily heat-sterilized (125° C.). However, the PVDF membranes are not hydrophilic and this is a notable disadvantage, especially when they are destined for ultrafiltration and/or microfiltration operations wherein aqueous solutions are employed.

After semipermeable PVDF membranes have been dried, they must be treated, for example, for a few minutes with an aqueous solution containing 80% of alcohol, to impart hydrophilicity thereto, but this procedure is not particularly convenient in industrial facilities requiring the use of such membranes.

Another technique for rendering permeable PVDF membranes hydrophilic consists, for example, in treating it with a base and then reacting it with polyethyleneimine, as described in published Japanese Application, Kokai No. 53/110,680. Such technique, however, entails complex chemical processing.

SUMMARY OF THE INVENTION

Accordingly, a major object of the present invention is the provision of improved semipermeable PVDF membranes which are conspicuously devoid of those disadvantages and drawbacks characterizing the PVDF membranes heretofore known to this art.

Another object of the present invention is the provision of improved semipermeable PVDF membranes which, while retaining the advantages offered by PVDF membrane material, are also hydrophilic, which property is retained even after the subject membranes have been dried.

Another object of this invention is the provision of isotropic or anisotropic, hydrophilic semipermeable PVDF membranes which can be dried and are advantageously in the form of planar membranes or hollow fibers, with the range of cut-off regions thereof being very wide.

Yet another object of the present invention is the provision of semipermeable membranes having all of those advantages described above and which can additionally be prepared in very simple fashion, without the necessity for surface treatments of a preformed PVDF membrane and without the necessity for a PVDF copolymer containing hydrophilic functional groups provided by monomer(s) other than the PVDF monomer.

Briefly, the present invention features hydrophilic semipermeable membranes capable of being dried, while at the same time retaining the chemical and physical properties thereof, and which novel membranes are based on polyvinylidene fluoride, comprising at least 70% PVDF by weight thereof and a minor amount, i.e., no more than 30% by weight, of a hydrophilic polymer.

This invention also features a facile process for the preparation of hydrophilic semipermeable membranes which can be dried without deterioration of the properties thereof, and wherein said membranes are cast from a homogeneous solution of PVDF and of the hydrophilic polymer.

DETAILED DESCRIPTION OF THE PREFERRED EMBODIMENTS OF THE INVENTION

More particularly according to the present invention, the subject semipermeable membranes may be in the form of hollow fibers, that is to say, small tubes, the outer diameter of which is typically less than 1500 microns and the inner diameter of which is typically greater than 100 microns. Preferably, the outer diameter is smaller than 1000 microns and the inner diameter is greater than 150 microns. These hollow fibers may be isotropic, namely, their pores are distributed uniformly throughout their thickness, or they may be anisotropic, namely, such fibers have at least one active separatory layer supported by a porous layer, the pore diameters of which are larger. This active layer, designated the skin, may be on the outer and/or inner wall of the said fibers. The distance between the outer and inner walls of the hollow fibers, also referred to as the wall thickness, typically ranges from 50 to 450 microns, preferably from 100 to 300 microns.

In particular, insofar as the diameter of the pores in these fibers is concerned, this generally fluctuates between 30 Å and 10,000 Å (angstroms). As regards the hollow fibers which are useful for microfiltration, these are typically isotropic and the pore diameters thereof range from 100 to 10,000 Å. In the case of hollow fibers useful for ultrafiltration, these are advantageously anisotropic or asymmetrical, which means they comprise a skin layer, the latter having pores which typically range from 30 to 300 Å, while the underlying porous layer has pores of larger diameters. The thickness of this skin generally varies from 0.05 to 10 microns. When used for ultrafiltration, the hollow fibers according to the present invention have a wide range of cut-off thresholds (regions). The cut-off threshold (or region) of a membrane refers to the approximate limiting molecular weight of proteins, beginning at which said proteins are retained by the membrane in a proportion of more than 90% by weight. The determination of this limiting molecular weight is preferably carried out using protein standards.

The semipermeable membranes according to the present invention may also be in the form of planar membranes, that is to say, films or sheets. These membranes may be isotropic or anisotropic (having a skin) and the dimensions of their thickness or of their pore diameters correspond to those of the hollow fibers set forth above. If desired, these planar membranes may be mechanically reinforced by a woven or a nonwoven fabric, designated in the art as a "web", it being possible for this woven fabric to be, for example, a woven monofilament fabric made of polyester, for example polyethylene terephthalate, nylon, for example nylon 66, or polypropylene having a weight per unit area of from 40 to 150 g/m$^2$ (grams per square meter).

The membranes according to the present invention comprise at least 70% by weight, and preferably more than 85% by weight, of polyvinylidene fluoride (PVDF). This polymer is widely commercially available, particularly by Pennwalt (under the trademark Kynar), by Solvay (under the trademark Solef) or by Atochem (under the trademark Foraflon).

The hydrophilic polymers which comprise the semipermeable membranes containing more than 70% by weight of PVDF, which can be dried without deterioration in the hydrophilic and separatory properties thereof, are advantageously selected from among:

(i) cellulose polyacetates, especially the diacetate;

(ii) sulfonated polysulfones, especially sulfonated polyarylethersulfones, such as those described in U.S. Pat. No. 3,709,841;

(iii) copolymers of acrylonitrile with comonomers containing sulfonic groups, such as, for example, copolymers of acrylonitrile with sodium methallylsulfonate and, if desired, methyl methacrylate, etc.

It is not necessary to draw or stretch the membranes according to the present invention after the production thereof. They are prepared simply by dissolving PVDF and the hydrophilic polymer in a solvent, or a mixture of solvents, to produce a homogeneous solution, that is to say, a solution which remains clear at rest (without stirring) and at ambient temperature, without the appearance of turbidity, opalescence or the formation of separate layers which are visible (to the naked eye) over time (for example 24 hours).

The solvents employed are advantageously the polar solvents such as, for example, dimethylformamide, dimethylacetamide, N-methylpyrrolidone, dimethyl sulfoxide, or mixtures thereof.

The procedure used to prepare the membranes according to the present invention is as follows. First, a homogeneous solution of PVDF and of the hydrophilic polymer is prepared in a polar solvent, with the PVDF constituting at least 70% by weight of the total weight of polymer. Thus, the hydrophilic polymer and PVDF are gradually introduced into the polar solvent at ambient temperature, under stirring. The temperature of the mixture is then raised to from 65° C. to 100° C. and the stirring is continued at this temperature for from 2 hours to 6 hours. Advantageously, the solution obtained after cooling to ambient temperature may be filtered, for example through Diatrose WRJ, marketed by La Rochette CENPA, and then the resulting homogeneous solution may be stored at ambient temperature for from 1 to 48 hours. In certain instances it may be advantageous, before the polymers are introduced into the polar solvent, to add small amounts of water, for example, amounts of water of less than 2%, preferably less than 1%, based on the weight of the polar solvent. There may also be added to the mixture of the polar solvent and water small amounts of lithium chloride, generally less than 2% based on the weight of the polar solvent, which are completely dissolved in the latter before the polymers are introduced. When water has been added, it is preferable not to exceed a temperature of 100° C. subsequently, during the time when the polymers are being stirred therein.

The homogeneous polymer solution is then continuously passed through an annularly shaped die to produce hollow fibers, or through a slit-shaped die to produce planar membranes.

To produce planar membranes, more particularly, the homogeneous polymer solution exiting the die is cast onto a web which is traveling forward at the same time as and on an endless metal belt, namely, a belt turning around two rolls spaced a certain distance from each other. The solution deposited on the web is then immersed in a bath, essentially containing water, at a temperature of from 1° C. to 35° C. Advantageously, the membrane obtained is then subjected to a heat treatment in an aqueous medium at a temperature of from 65° C. to 95° C.

In order to further illustrate the present invention and the advantages thereof, the following specific examples are given, it being understood that same are intended only as illustrative and in nowise limitative.

EXAMPLE 1

This example demonstrates that a PVDF membrane devoid of the hydrophilic polymer loses its filtering properties after having been dried.

The following materials were charged into a stirred, thermostatically controlled reactor:

(i) 2,475 g of dimethylformamide, (ii) 15 g of distilled water, and (iii) 30 g of lithium chloride.

Stirring was carried out for 15 min (minutes) at 23° C. to dissolve the lithium chloride.

The following material was then added as a fine spray, under stirring:

(iv) 480 g of polyvinylidene fluoride (marketed by Atochem under the trademark Foraflon 1000HD).

The temperature was then raised to 95° C. over 75 min and was maintained thereat for 5 hours. The resulting solution obtained was filtered through Diatrose WRJ and was then stored in a holding tank at 25° C. for 8 hours.

This solution was cast continuously, by means of a die fed by a metering pump, onto a web consisting of a monofil polyester fabric 85 microns in thickness and having a mesh opening of 75 microns, which was travelling on a steel band, and simultaneously with the latter at a speed of 1 m/min (1 meter per minute). After one pass in a controlled atmosphere (35% relative humidity, temperature 23° C.), the film of polyvinylidene fluoride solution was coagulated for 12 min in water at 19° C. and was then treated in water at 80° C. for 5 min.

A membrane of asymmetrical porous structure was produced, a portion of which was maintained in distilled water and the other portion of which was dried for 24 hours at 50° C. in a ventilated oven.

Both samples were used to measure the flow rate for distilled water and the degree of retention of bovine albumin. An Amicon model 52 cell was used for this purpose. For determining the degree of retention of albumin (molecular weight 67,000 daltons), an aqueous solution was used at a concentration of 2 g/l, buffered to a pH of 7.4.

The dried membrane sample was clearly hydrophobic in nature and a pressure of 1 bar had to be attained before obtaining a very slow flow rate for water, less than 1 liter/hr/m$^2$, 1 bar (liters per hour, per m$^2$, at a pressure differential of 1 bar). Thus, this membrane could not be used for ultrafiltration.

On the other hand, the membrane which was kept wet had very different properties. Its water flow rate, measured at a pressure differential of 1 bar, was 200 liters/hr/m$^2$ and the degree of retention of bovine albumin was 80%. The degree of retention of gamma globulin (MW 157,000 daltons) was 100%.

EXAMPLE 2

This example demonstrates the production and use of a membrane according to the invention.

The following materials were dissolved:
(i) 480 g of polyvinylidene fluoride (marketed by Atochem under the trademark Foraflon 1000HD); and
(ii) 60 g of cellulose polyacetate, the degree of acetylation of which was 55% and its viscosity at 23° C. as a 12% w/w solution in acetone was 297 centipascals per second, in the following mixture:
(iii) lithium chloride: 30 g
(iv) distilled water: 15 g
(v) dimethylformamide: 2,415 g For this purpose, the dimethylformamide, demineralized water and lithium chloride were charged into a thermostatically controlled reactor and were stirred at 23° C. for 15 min to ensure that the lithium chloride dissolved. Cellulose polyacetate, followed by polyvinylidene fluoride, were then charged therein, under stirring, over 10 min and the temperature of the mixture was raised from 23° C. to 95° C. in 75 min. The temperature of 95° C. and stirring (300 rev/min) were maintained for 5 hours. The resulting solution was then filtered through Diatrose WRJ and was poured into a storage vessel and remained therein for 8 hours to ensure its degassing and its stabilization at 25° C.

This solution was then cast continuously, by means of a die fed by a metering pump, onto a web consisting of a nylon 66 monofil 120 microns in thickness and having a mesh gap of 71 microns. This web was carried by an endless steel band (rotating around 2 rolls at a certain distance from each other) which travelled at the same speed as this band, at 1 m/min. After one pass for 45 seconds in a controlled atmosphere (23° C., 35% relative humidity), the polymer film was coagulated for 12 min in water at 20° C. and was then heat-treated for 5 min in water at 80° C. A membrane was obtained which had an anisotropic porous structure characteristic of the ultrafiltration membranes produced by phase inversion.

A sample of this membrane was kept wet in distilled water, while a second sample was permitted to dry for 48 hr in a ventilated oven at 50° C.

Both samples were employed to measure the flow rate of distilled water and the degree of retention of bovine albumin (molecular weight 67,000 daltons), and of gamma globulins (MW 156,000 daltons).

An Amicon model 52 cell was used, at a relative pressure of 20 grams and with a protein concentration of 2 g/l at pH 7.4.

Virtually identical results were obtained from the sample which was kept wet and with the dried sample, namely:

| MEMBRANE TYPE | THICKNESS (total) microns | WATER FLOW RATE l/hr/m², 1 bar | DEGREE OF RETENTION bovine albumin | gamma-globulins |
|---|---|---|---|---|
| kept wet | 167 | 3,600 | 30% | 81% |
| dried | 165 | 3,500 | 30% | 81% |

The degrees of retention were calculated using the formula:

$$DR = \frac{(\text{concentration in retained material}) - (\text{concentration in the filtrate})}{(\text{concentration in retained material})} \times 100$$

It will thus be seen that the drying did not adversely affect the characteristics of this membrane. It could be reused without a preliminary treatment after it had been dried. It will also be seen that the water flow rates obtained using this membrane were much higher than those obtained using the membrane according to Example 1.

EXAMPLE 3

This example also demonstrates the production and use of a membrane according to the invention.

A solution having the following composition was prepared in the same manner as in Example 2:
(i) polyvinylidene fluoride: 12.6%, i.e., 378 g
(ii) cellulose polyacetate: 1.4%, i.e., 42 g
(iii) lithium chloride: 1%, i.e., 30 g
(iv) distilled water: 0.5%, i.e., 15 g
(v) dimethylformamide: 84.5%, i.e., 2,535 g An asymmetrical porous membrane, but which was reinforced with a monofil polyester woven fabric 85 microns in thickness and having a mesh opening of 75 microns, was prepared, also in the same manner as in Example 2.

As in Example 2, a sample of wet membrane and a sample of dried membrane were used to measure the flow rate for distilled water and the degree of retention, using an aqueous solution of bovine albumin at a concentration of 2 g/l and buffered to pH 7.4 and a solution containing 2 g/l of gamma globulins. Identical results were obtained for both samples.

| MEMBRANE TYPE | THICKNESS (total) microns | WATER FLOW RATE l/hr/m², 1 bar | DEGREE OF RETENTION bovine albumin | gamma-globulins |
|---|---|---|---|---|
| kept wet or dried | 187 | 8,220 | 11.5% | 80.3% |

According to the invention, therefore, PVDF-based membranes can be produced which have high water flow rates with a cut-off threshold which, in this case, was in the region of 200,000 daltons.

EXAMPLE 4

This example also demonstrates the production and use of a membrane according to the invention.

160 g of polyvinylidine fluoride (Foraflon 1000 HD) and 20 g of a sulfonated polysulfone (obtained according to Example 1 described in Rhône-Poulenc's French Patent No. 2,040,950) were dissolved, in the same manner as in the preceding examples, in a medium consisting of 10 g of lithium chloride, 5 g of distilled water and 805 g of dimethylformamide.

This solution was used to prepare a membrane according to the process described earlier in Example 3. In this example, a nylon monofil-based woven fabric 120 microns in thickness and having a mesh opening of 75 microns was incorporated into the membrane.

The properties of the dried membrane and of the membrane which was kept wet were compared. The results are as follows:

| MEMBRANE TYPE | WATER FLOW RATE l/hr/m², 1 bar | DEGREE OF RETENTION bovine albumin |
|---|---|---|
| kept wet | 1,740 | 32% |
| dried | 2,380 | 32% |

While the invention has been described in terms of various preferred embodiments, the skilled artisan will appreciate that various modifications, substitutions, omissions, and changes may be made without departing from the spirit thereof. Accordingly it is intended that the scope of the present invention be limited solely by the scope of the following claims, including equivalents thereof.

What is claimed is:

1. A hydrophilic semipermeable membrane comprising at least 70% by weight of polyvinylidene fluoride, and a minor effective amount, no more than 30% by weight, of a hydrophilic polymer compatible therewith selected from the group consisting of sulfonated polysulfone and copolymers of acrylonitrile and sulfone monomers.

2. The semipermeable membrane as defined by claim 1, comprising at least 85% by weight of polyvinylidene fluoride and no more than 15% by weight of sulfonated polysulfone.

3. The semipermeable membrane as defined by claim 1, comprising at least 85% by weight of polyvinylidene fluoride and no more than 15% by weight of a copolymer of acrylonitrile and sulfone monomers.

4. The semipermeable membrane as defined by claim 1, comprising a hollow fiber shaped article.

5. The semipermeable membrane as defined by claim 1, comprising a planar shaped article.

6. The semipermeable membrane as defined by claims 4 or 5, comprising an isotropic shaped article.

7. The semipermeable membrane as defined by claims 4 or 5, comprising an anisotropic shaped article.

8. The semipermeable membrane as defined by claim 7, comprising a reinforcing porous support layer.

9. The semipermeable membrane as defined by claim 1, heat-treated to a temperature of from 65° C. to 95° C.

* * * * *